United States Patent
Lee et al.

(10) Patent No.: US 12,536,685 B2
(45) Date of Patent: Jan. 27, 2026

(54) IMAGE FEATURE MATCHING METHOD, COMPUTER DEVICE, AND STORAGE MEDIUM

(71) Applicant: HON HAI PRECISION INDUSTRY CO., LTD., New Taipei (TW)

(72) Inventors: Wan-Jhen Lee, New Taipei (TW); Chin-Pin Kuo, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 642 days.

(21) Appl. No.: 17/857,098

(22) Filed: Jul. 4, 2022

(65) Prior Publication Data

US 2023/0386055 A1    Nov. 30, 2023

(30) Foreign Application Priority Data

May 31, 2022    (CN) .......................... 202210613476.7

(51) Int. Cl.
| | |
|---|---|
| *G06T 7/60* | (2017.01) |
| *G06T 7/13* | (2017.01) |
| *G06T 7/529* | (2017.01) |
| *G06T 7/593* | (2017.01) |
| *G06T 7/90* | (2017.01) |

(52) U.S. Cl.
CPC .................. *G06T 7/60* (2013.01); *G06T 7/13* (2017.01); *G06T 7/529* (2017.01); *G06T 7/593* (2017.01); *G06T 7/90* (2017.01); *G06T 2207/10024* (2013.01)

(58) Field of Classification Search
CPC ....................... G06T 7/50–68; G06T 7/10–174
See application file for complete search history.

(56) References Cited

U.S. PATENT DOCUMENTS

| | | | | |
|---|---|---|---|---|
| 6,282,326 B1* | 8/2001 | Lee | ....................... | H04N 1/4097 |
| | | | | 382/289 |
| 6,975,755 B1* | 12/2005 | Baumberg | ................ | G06T 7/97 |
| | | | | 348/42 |
| 9,154,773 B2* | 10/2015 | Ding | ....................... | G06T 7/593 |
| 10,059,002 B2* | 8/2018 | Miyatani | .............. | G06V 10/993 |
| 2012/0308126 A1* | 12/2012 | Hwang | ..................... | G06T 5/50 |
| | | | | 382/167 |
| 2019/0222744 A1* | 7/2019 | Qin | .......................... | G06T 3/10 |

FOREIGN PATENT DOCUMENTS

| | | |
|---|---|---|
| CN | 108596975 | 9/2018 |
| CN | 114331951 | 4/2022 |

\* cited by examiner

*Primary Examiner* — Barbara D Reinier
(74) *Attorney, Agent, or Firm* — ScienBiziP, P.C.

(57) ABSTRACT

An image feature matching method is provided by the present disclosure. The method includes determining a first weak texture area of a first image and a second weak texture area of a second image based on an edge detection algorithm. First feature points of the first weak texture area and second feature points of the second weak texture area are extracted. The first feature points and the second feature points are matched by determining a target point for each of the first feature points from the second feature points. Once a position difference value between each first feature point and the corresponding target point is determined, a matching point for each first feature point is determined according to the position difference value between the each first feature point and the corresponding target point.

7 Claims, 4 Drawing Sheets

IMAGE FEATURE MATCHING METHOD, COMPUTER DEVICE, AND STORAGE MEDIUM

FIELD

The present disclosure relates to image processing technologies, in particular to an image feature matching method, a computer device, and a storage medium.

BACKGROUND

Image stereo matching mainly refers to establishing a pixel correspondence between two two-dimensional images, a calculation of a disparity between the two two-dimensional images, and the obtaining of a disparity image. In a current stereo matching technology, errors in matching occur due to factors such as illumination influence, occlusion, and low-texture areas of a scene of an image. Especially when matching low-texture areas, when an entire area has a same color with low-texture, misjudgment may be easily made, and a judgement for determining whether a matching is successful using color only may cause great errors.

DETAILED DESCRIPTION

Figure 1:
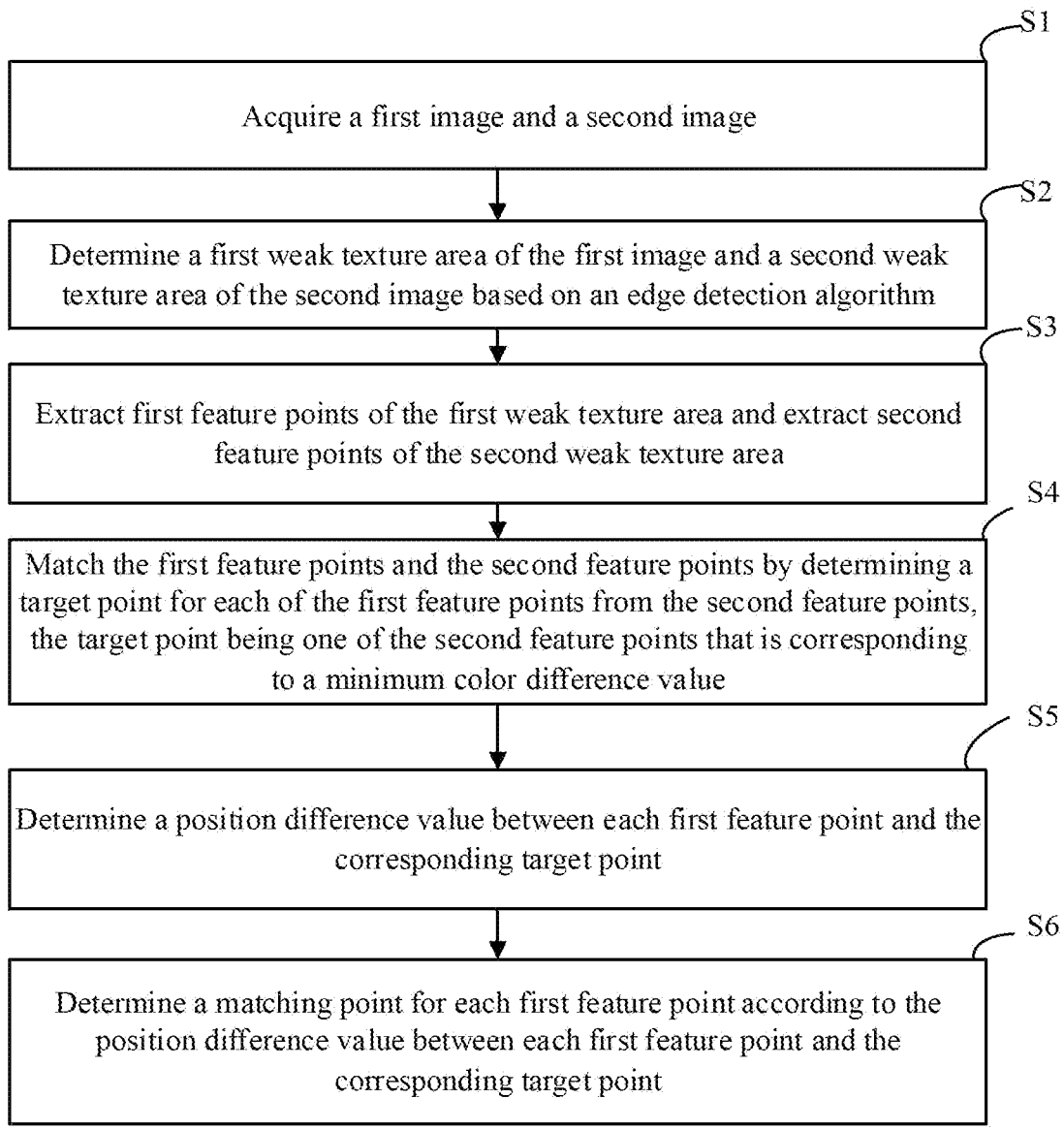
FIG. 1 is a flowchart of an image feature matching method provided by an embodiment of the present disclosure.

In order to provide a more clear understanding of the objects, features, and advantages of the present disclosure, the same are given with reference to the drawings and specific embodiments. It should be noted that the embodiments in the present disclosure and the features in the embodiments may be combined with each other without conflict.

In the following description, numerous specific details are set forth in order to provide a full understanding of the present disclosure. The present disclosure may be practiced otherwise than as described herein. The following specific embodiments are not to limit the scope of the present disclosure.

Unless defined otherwise, all technical and scientific terms herein have the same meaning as used in the field of the art technology as generally understood. The terms used in the present disclosure are for the purposes of describing particular embodiments and are not intended to limit the present disclosure.

At block S1, the computer device acquires a first image and a second image.

In one embodiment, the computer device may acquire the first image and the second image in response to user input. The computer device may be connected to at least one camera, and acquires the first image and second image directly from the at least one camera. The computer device may also pre-store the first image and the second image in a storage device of the computer device, or pre-store the first image and the second image in other devices communicatively connected to the computer device. The first image and the second image may be images of a same object or a same scene taken from two different viewing angles.

In one embodiment, the computer device may acquire an image (hereinafter named as "initial image"), perform a scale transformation and a resolution transformation on the initial image, obtain two images with different scales and resolutions, and determine the two images as the first image and the second image. For example, the computer device may perform the scale transformation on the initial image based on a scale-invariant feature transform (SIFT) technology according to a preset scale factor, and then perform the resolution transformation on the initial image based on a Gaussian blur algorithm.

In the embodiment, a size of the first image and a size of the second image are the same.

At block S2, the computer device determines a first weak texture area of the first image and a second weak texture area of the second image based on an edge detection algorithm.

In one embodiment, the determining of the first weak texture area of the first image and the second weak texture area of the second image based on the edge detection algorithm includes:

Determining a first object edge of the first image by using the edge detection algorithm, marking the first object edge, and determining an area within the first object edge as being the first weak texture area, wherein the edge detection algorithm includes Canny algorithm;

Determining a second object edge of the second image by using the edge detection algorithm, marking the second object edge, and determining an area within the second object edge as the second weak texture area.

In one embodiment, the computer device determines the first object edge of the first image using the Canny algorithm, includes:

Obtaining a grayscale value of each pixel point in the first image, generating a filter operator based on a Gaussian formula, and obtaining a first denoised image by denoising the first image according to the filter operator and the grayscale value of each pixel point in the first image;

Obtaining a gradient of each pixel point in the first image by performing a gradient calculation on the first denoised image using a preset Gaussian filter, and obtaining a gradient magnitude image of the first denoised image;

Performing non-maximum suppression processing on the gradient magnitude image, and determining initial object edge points, wherein when a gradient magnitude of any one pixel point in the gradient magnitude image is greater than a gradient magnitude of each of two adjacent pixel points of the any one pixel point along a gradient direction, determining the any one pixel point as the initial object edge point;

Obtaining target edge points by screening the initial object edge points based on a double threshold algorithm, the screening of the initial object edge points includes eliminating each object edge point which have a threshold lower than a preset threshold from the initial object edge points;

Obtaining the first object edge by connecting the target edge points.

In one embodiment, the computer device may perform edge detection on the first image by using a Roberts operator, a Prewitt operator, a Sobel operator or a Laplacian operator.

In one embodiment, the computer device may mark the first object edge by setting the first object edge to any color by using a pre-written MATLAB® (MATrix LABoratory) coding program.

In one embodiment, a method of determining the second object edge is the same as a method of determining the first object edge, and the method of marking the second object edge is the same as the method of marking the first object edge. It will not be repeated here.

In one embodiment, the weak texture area is a relative concept, a same object or a same scene is a weak texture area in a higher resolution image, and will have richer details in a lower resolution image.

At block S3, the computer device extracts first feature points of the first weak texture area and extracts second feature points of the second weak texture area.

In one embodiment, the extracting of the first feature points of the first weak texture area and the extracting of the second feature points of the second weak texture area includes:

Detecting Harris corners of the first image, and determining the Harris corners in the first image as the first feature points of the first image;

Detecting Harris corners of the second image, and determining the Harris corners in the second image as being the second feature points of the second image.

In one embodiment, the computer device may detect the Harris corners of the first image and detect the Harris corners of the second image using a cornerHairrs( ) function of OPENCV™ (open-source computer vision library). A principle of a Harris corner detection algorithm includes: creating a local window centered on any one pixel point in an image; if a slight movement of the local window in any direction leads to a significant change in grayscale value (for example, a change in grayscale value is greater than a first preset value), then the any one pixel point is considered to be a Harris corner.

At block S4, the computer device matches the first feature points and the second feature points by determining a target point for each of the first feature points from the second feature points, the target point refers to one of the second feature points that corresponds to a minimum color difference value.

In an embodiment, the determining of the target point for each of the first feature points from the second feature points includes:

Setting the first image as a reference image, and determining corresponding points for each first feature point from the second feature points according to epipolar constraint and determining a total number of the corresponding points;

For each first feature point, when the total number of the corresponding points is greater than a second preset value (for example, 1), calculating a color difference value between the each first feature point and each of the corresponding points, and determining one of the corresponding points that corresponds to the minimum color difference value as being the corresponding target point.

In one embodiment, when the total number of the corresponding points is equal to one, the computer device can directly determine the one corresponding point as the corresponding target point without calculating the color difference value between the first feature point and the one corresponding point.

In one embodiment, the epipolar constraint describes constraints formed by image points and a camera optical center under a projection model when a same point is projected onto images from two different viewing angles, a search range can be reduced when matching points based on features according to the epipolar constraint.

Figures 2, 3:
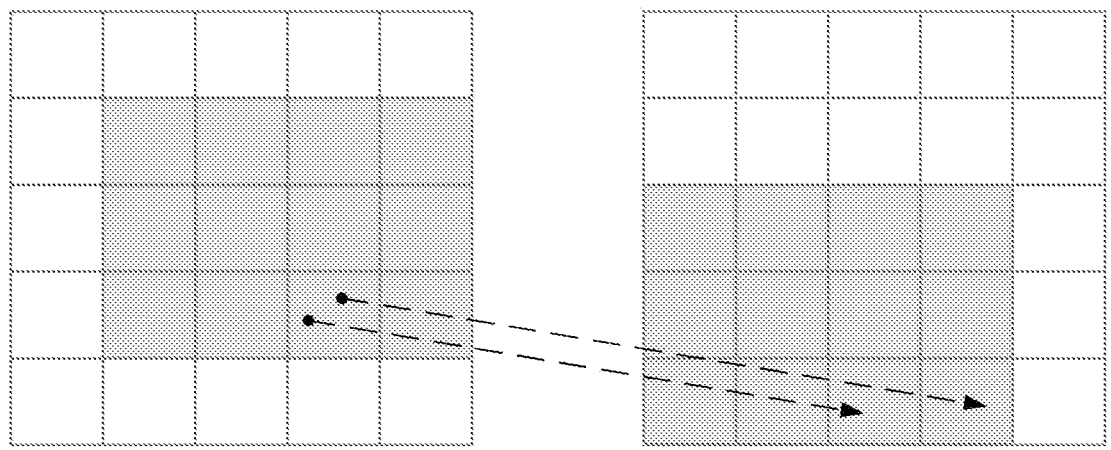
FIG. 2 is an example of a first feature point and a corresponding target point provided by an embodiment of the present disclosure.
FIG. 3 is an example of calculating a first distance parameter along an "up" direction provided by an embodiment of the present disclosure.

For example, as shown in FIG. 2, which is an example of a first feature point and a corresponding target point provided by an embodiment of the present disclosure, an image on the left represents the first image, an image on the right represents the second image, and each of the first weak texture area and the second weak texture area is represented using a shaded part, wherein each small square represents a pixel point (including the first feature point or the second feature point). As indicated by the dotted arrows in FIG. 2, when the color difference value between any one of the first feature points (e.g., the pixel point where a starting point of the dashed arrow in the image on left is located) and each of two adjacent corresponding points of the any one of the first feature points (e.g., two pixel points each of which is corresponding to an arrowhead of the dashed arrow in the image on right) are same, there will be two corresponding target points, so color only cannot be used as a judgment basis for matching.

At block S5, the computer device determines a position difference value between each first feature point and the corresponding target point.

In one embodiment, the determining of the position difference value between each first feature point and the corresponding target point includes:

Calculating a first distance parameter between the first object edge and each first feature point;

Calculating a second distance parameter between the target point of each first feature point and the second object edge; and Calculating the position difference value according to the first distance parameter and the second distance parameter.

In one embodiment, each of the first distance parameter and the second distance parameter includes a distance value in each of a preset number of directions (for example, calculated according to a length (e.g., 1) occupied by each pixel point).

The computer device calculates the distance value in any one of the preset number of directions based on an ending criterion, which includes: ending the calculating of the distance value in any one of the preset number of directions when an object edge (i.e., the first object edge or the second object edge) or an image edge (i.e., an edge of the first image or an edge of the second image) is detected.

For example, the preset number may equal 4, and the four directions may include directions of "up, down, left, and right". The first distance parameter may include a distance value between the first feature point and the first object edge in each of the four directions.

For example, as shown in FIG. 3, an example of calculating the first distance parameter in an "up" direction is provided by an embodiment of the present direction. FIG. 3 shows the first image, wherein a shaded part in the first image represents the first object edge, and wherein each small square in the first image represents a pixel point (including the first feature point), and a number shown in each small square represents the distance parameter in the direction of "up" between the each pixel point and the first object edge. The pixel point where the starting point of the solid line arrow is located represents a starting position for calculating the distance parameter in the direction of "up", and the pixel point where the arrowhead of the solid line arrow is located represents an end position (including the edge of the first image or the edge of the first image) when the calculation is stopped according to the ending criterion.

Figures 4, 5:
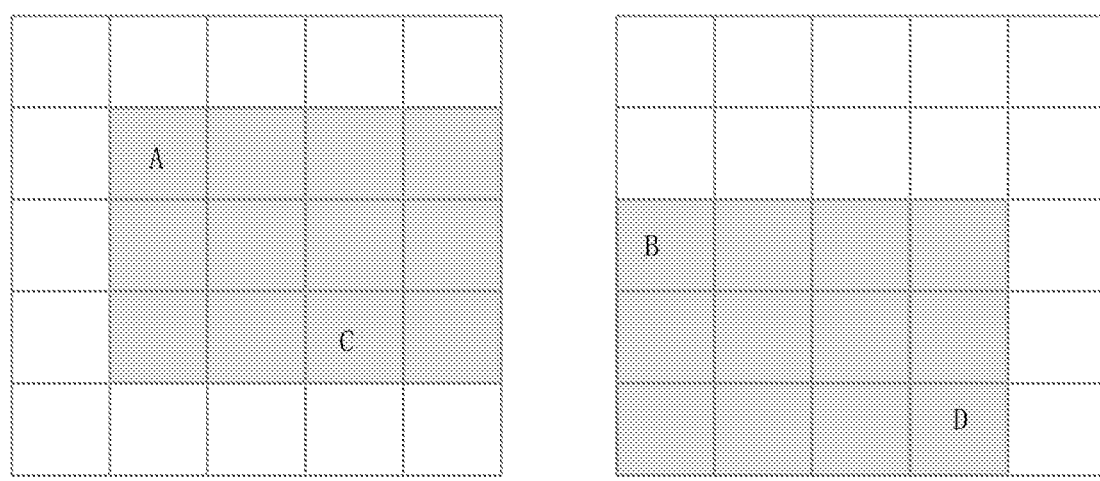
FIG. 4 is an example of calculating a first distance parameter along a "left" direction provided by an embodiment of the present disclosure.
FIG. 5 is an example of first feature points A and C and corresponding target points B and D provided by an embodiment of the present disclosure.

For example, as shown in FIG. 4, an example of calculating a first distance parameter along a "left" direction is provided by an embodiment of the present direction. FIG. 4 shows the first image, wherein the shaded part represents the first object edge, wherein each small square represents a pixel point (including the first feature point), and the number shown in each small square represents the distance parameter in the "left" direction between the each pixel point and the first object edge. The pixel point where the starting point of the solid line arrow is located represents the starting position of calculating the distance parameter in the "left" direction, and the pixel point where the arrow point of the solid line arrow is located represents an end position when the calculation is ended according to the ending criterion. The end position includes the edge of the first image or the edge of the first object edge.

In one embodiment, the calculation method for calculating the distance parameters in the "right" and "down" directions is similar to the above example. The method of calculating the second distance parameter is the same as the method of calculating the first distance parameter.

For example, as shown in FIG. 5, according to the above method, the first distance parameter of the first feature point A in the shaded part of the first image on the left is (1, 1, 1, 1) which respectively correspond to "up, down, left and right" directions, wherein the shaded part of the first image represents the first weak texture area. Similarly, according to the above method, the second distance parameter of the corresponding target point B in the shaded part of the second image on the right is (2, 1, 0, 1) which respectively correspond to "up, down, left, right" directions, wherein the shaded part of the second image represents the second weak texture area.

Similarly, according to the above method, the first distance parameter of the first feature point C in the shaded part of the first image on the left is (2, 1, 1, 1) which respectively correspond to "up, down, left and right" directions; the second distance parameter of the corresponding target point D in the upper left corner of the shadow part of the second image on the right is (1,0,1,1) which respectively correspond to "up, down, left, right" directions.

In one embodiment, the calculating of the position difference value according to the first distance parameter and the second distance parameter includes:

Calculating an initial position difference corresponding to each direction according to the first distance parameter and the second distance parameter;

Obtaining the position difference by performing a weighted calculation to the initial position difference value corresponding to each of the preset number of directions according to a preset weight.

For example, as shown in FIG. 5, the first distance parameter of the first feature point A is (1,1,1,1), and the second distance parameter of the corresponding target point B is (2,1,0,1). When the electronic device calculates the initial position difference corresponding to each direction, the electronic device can regard the first distance parameter and the second distance parameter as vectors and perform correspondingly subtraction: (1,1,1,1)−(2,1,0,1)=(−1,0,1,0), so that the initial position differences corresponding to the four directions of "up, down, left, and right" between the first feature point A and the corresponding target point B are −1, 0, 1, and 0, respectively. It should be noted that, in other embodiments, the initial position differences may also be an absolute value.

Similarly, the electronic device can obtain the initial position differences corresponding to the four directions of "up, down, left, and right" between the first feature point C and the corresponding target point D as being 1, 1, 0, and 0, respectively.

In one embodiment, the electronic device may set the preset weight based on the same object or same scene in the first image and the second image. For example, when the same object is a vertical fence, and more attention should be paid to the calibration of its left and right directions, and then the weight of the left and right directions can be set to 2, and the weight of the upper and lower directions can be set to 1.

For example, the initial position differences corresponding to the "up, down, left, and right" directions between the first feature point A and the corresponding target point B are −1, 0, 1, and 0, respectively. The preset weight of the left and right directions is set to be 2, and the preset weight of the upper and lower directions is set to be 1, then the weighted calculation is: −1×1+0×1+1×2+0×2=1, that is, the position difference value between the first feature point A and the corresponding target point B is 1.

Similarly, the position difference between the first feature point C and the corresponding target point D is: 1×1+1×1+0×2+0×2=2.

At block S6, the computer device determines a matching point for each first feature point according to the position difference value between the each first feature point and the corresponding target point.

In one embodiment, the determining of the matching point of each first feature point according to the position difference value between the each first feature point and the corresponding target point includes:

Determining whether the position difference value between the each first feature point and the corresponding target point is within a preset threshold range (for example, 0-1);

For any one of the first feature points, determining the corresponding target point as the matching point of the any one of first feature points when the position difference value between the any one of first feature points and the corresponding target point is within the preset threshold range; or Determining that the corresponding target point is not the matching point of the any one of first feature points when the position difference value between the any one of first feature points and the corresponding target point is not within the preset threshold range.

For example, the position difference value between the first feature point A and the corresponding target point B is 1, which is within the preset threshold range of [0, 1], so the corresponding target point B is determined as being the matching point of the first feature point A. The position difference value between the first feature point C and the corresponding target point D is 2, which is not within the preset threshold range, so the corresponding target point D is not a matching point of the first feature point C.

FIG. 1 describes in detail the method for matching image features of the present disclosure. Hardware architecture that implements the method for matching image features is described in conjunction with FIG. 6.

It should be understood that the described embodiments are for illustrative purposes only, and are not limited by this structure in the scope of the claims.

Figure 6:
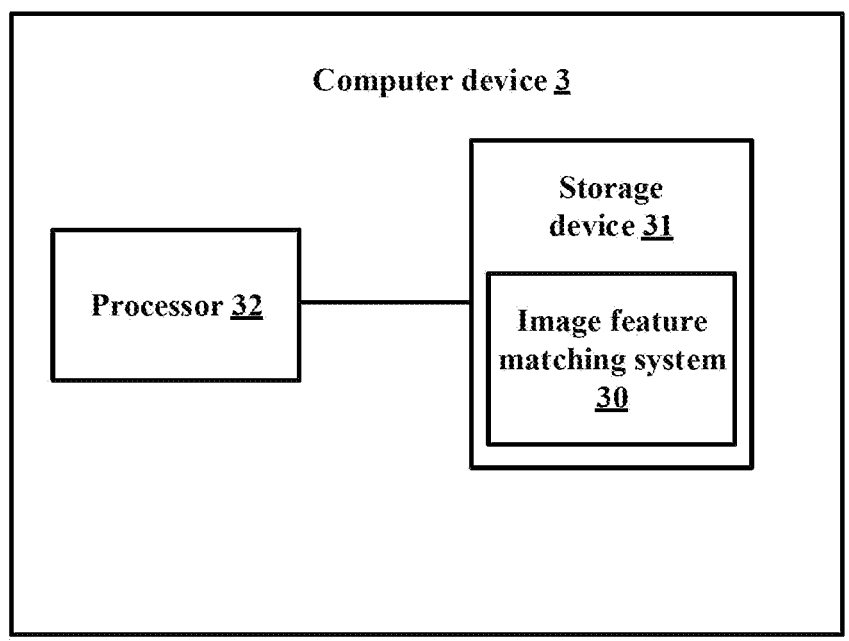
FIG. 6 is a structural diagram of a computer device provided by an embodiment of the present disclosure.

FIG. 6 is a block diagram of a computer device provided by the present disclosure. The computer device 3 may include a storage device 31 and at least one processor 32. It should be understood by those skilled in the art that the structure of the computer device 3 shown in FIG. 4 does not constitute a limitation of the embodiment of the present disclosure. The computer device 3 may further include other hardware or software, or the computer device 3 may have different component arrangements.

In at least one embodiment, the computer device 3 may include a terminal that is capable of automatically performing numerical calculations and/or information processing in accordance with pre-set or stored instructions. The hardware of terminal can include, but is not limited to, a microprocessor, an application specific integrated circuit, programmable gate arrays, digital processors, and embedded devices.

It should be noted that the computer device 3 is merely an example, and other existing or future electronic products may be included in the scope of the present disclosure, and are thus included in the reference.

In some embodiments, the storage device 31 can be used to store program codes of computer readable programs and various data, such as an image feature matching system 30 installed in the computer device 3, and automatically access the programs or data with high speed during the running of the computer device 3. The storage device 31 can include a read-only memory (ROM), a random access memory (RAM), a programmable read-only memory (PROM), an erasable programmable read only memory (EPROM), an one-time programmable read-only memory (OTPROM), an electronically-erasable programmable read-only memory (EEPROM)), a compact disc read-only memory (CD-ROM), or other optical disk storage, magnetic disk storage, magnetic tape storage, or any other storage medium readable by the computer device 3 that can be used to carry or store data.

In some embodiments, the at least one processor 32 may be composed of an integrated circuit, for example, may be composed of a single packaged integrated circuit, or multiple integrated circuits of same function or different functions. The at least one processor 32 can include one or more central processing units (CPU), a microprocessor, a digital processing chip, a graphics processor, and various control chips. The at least one processor 32 is a control unit of the computer device 3, which connects various components of the computer device 3 using various interfaces and lines. By running or executing a computer program or modules stored in the storage device 31, and by invoking the data stored in the storage device 31, the at least one processor 32 can perform various functions of the computer device 3 and process data of the computer device 3. For example, the processor 32 may perform the function of matching image features shown in FIG. 1.

In some embodiments, the image feature matching system 30 operates in computer device 3. The image feature matching system 30 may include a plurality of functional modules composed of program code segments. The program code of each program segment in the image feature matching system 30 can be stored in storage device 31 of the computer device 3 and executed by at least one processor 32 to achieve blocks of method as shown in FIG. 1.

In this embodiment, the image feature matching system 30 can be divided into a plurality of functional modules. The "Module" means a series of computer program segments that can be executed by at least one processor 32 and perform fixed functions and are stored in storage device 31.

The program codes are stored in storage device 31 and at least one processor 32 may invoke the program codes stored in storage device 31 to perform the related function. The program codes stored in the storage device 31 can be executed by at least one processor 32, so as to realize the function of each module to achieve the purpose of matching image features as shown in FIG. 1.

In one embodiment of this application, said storage device 31 stores at least one instruction, and said at least one instruction is executed by said at least one processor 32 for the purpose of matching image features as shown in FIG. 1.

Although not shown, the computer device 3 may further include a power supply (such as a battery) for powering various components. Preferably, the power supply may be logically connected to the at least one processor 32 through a power management device, thereby, the power management device manages functions such as charging, discharging, and power management. The power supply may include one or more DC or AC power sources, a recharging device, a power failure detection circuit, a power converter or inverter, a power status indicator, and the like. The computer device 3 may further include various sensors, such as a BLUETOOTH® (short-range wireless communication technology) module, a WI-FI module, and the like, and details are not described herein.

In the several embodiments provided in this disclosure, it should be understood that the devices and methods disclosed can be implemented by other means. For example, the device embodiments described above are only schematic. For example, the division of the modules is only a logical function division, which can be implemented in another way.

The modules described as separate parts may or may not be physically separate, and the parts displayed as modules may or may not be physical units, that is, may be located in one place, or may be distributed over multiple network units. Part or all of the modules can be selected according to the actual needs to achieve the purpose of this embodiment.

In addition, each functional unit in each embodiment of the present disclosure can be integrated into one processing unit, or can be physically present separately in each unit, or two or more units can be integrated into one unit. The above integrated unit can be implemented in a form of hardware or in a form of a software functional unit.

The above integrated modules implemented in the form of function modules may be stored in a storage medium. The above function modules may be stored in a storage medium, and include several instructions to enable a computing device (which may be a personal computer, server, or network device, etc.) or processor to execute the method described in the embodiment of the present disclosure.

The present disclosure is not limited to the details of the above-described exemplary embodiments, and the present disclosure can be embodied in other specific forms without departing from the spirit or essential characteristics of the present disclosure. Therefore, the present embodiments are to be considered as illustrative and not restrictive, and the scope of the present disclosure is defined by the appended claims. All changes and variations in the meaning and scope of equivalent elements are included in the present disclosure. Any reference sign in the claims should not be construed as limiting the claim. Furthermore, the word "comprising" does not exclude other units nor does the singular exclude the plural. A plurality of units or devices stated in the system claims may also be implemented by one unit or device through software or hardware. Words such as "first" and "second" are used to indicate names but not to signify any particular order.

The above description is only embodiments of the present disclosure and is not intended to limit the present disclosure, and various modifications and changes can be made to the present disclosure. Any modifications, equivalent substitutions, improvements, etc. made within the spirit and scope of the present disclosure are intended to be included within the scope of the present disclosure.

What is claimed is:

1. An image feature matching method applied to a computer device, the method comprising:

acquiring a first image and a second image by capturing a same object from two different viewing angles using at least one camera connected to the computer device;

extracting first feature points of the first image, and extracting second feature points of the second image;

matching the first feature points and the second feature points by determining a target point for each of the first feature points from the second feature points, the target point being one of the second feature points that corresponds to a minimum color difference value, and comprising: setting the first image as a reference image, and determining corresponding points for each first feature point from the second feature points according to epipolar constraint and determining a total number of the corresponding points, the corresponding points being selected from the second feature points; for each first feature point, when the total number of the corresponding points is greater than a preset value, calculating a color difference value between each first feature point and each of the corresponding points, and obtaining color difference values; and determining one of the corresponding points that is corresponding to the minimum color difference value in the color difference values as the target point;

determining a position difference value between each first feature point and a corresponding target point; and determining whether the corresponding target point is a matching point of each first feature point according to the position difference value between each first feature point and the corresponding target point;

wherein the method further comprises:

determining a first object edge of the first image by using an edge detection algorithm, and marking the first object edge; determining a second object edge of the second image by using the edge detection algorithm, and marking the second object edge;

wherein determining the position difference value between each first feature point and the corresponding target point comprises: calculating a first distance parameter between the first object edge and each first feature point; calculating a second distance parameter between the target point of each first feature point and the second object edge; and calculating the position difference value according to the first distance parameter and the second distance parameter;

wherein each of the first distance parameter and the second distance parameter comprises a distance value in each of a preset number of directions;

wherein calculating the position difference value according to the first distance parameter and the second distance parameter comprises: calculating an initial position difference corresponding to each direction according to the first distance parameter and the second distance parameter; obtaining the position difference value by performing a weighted calculation to the initial position difference corresponding to each of the preset number of directions according to a preset weight.

2. The image feature matching method according to claim 1, further comprising:

extracting the first feature points from an area within the first object edge, and extracting the second feature points from an area within the second object edge.

3. The image feature matching method according to claim 1, wherein determining whether the corresponding target point is the matching point of each first feature point according to the position difference value between each first feature point and the corresponding target point comprises:

determining whether the position difference value between each first feature point and the corresponding target point is within a preset threshold range;

for any one of the first feature points, determining the corresponding target point as the matching point of the any one of first feature points when the position difference value between the any one of first feature points and the corresponding target point is within the preset threshold range; or determining the corresponding target point is not the matching point of the any one of first feature points when the position difference value between the any one of first feature points and the corresponding target point is not within the preset threshold range.

4. A computer device comprising:

a storage device;

at least one processor; and the storage device storing one or more programs, which when executed by the at least one processor, cause the at least one processor to:

acquire a first image and a second image by capturing a same object from two different viewing angles using at least one camera connected to the computer device;

extract first feature points of the first image, and extract second feature points of the second image; match the first feature points and the second feature points by determining a target point for each of the first feature points from the second feature points, the target point being one of the second feature points that is corresponding to a minimum color difference value, and comprising: setting the first image as a reference image, and determining corresponding points for each first feature point from the second feature points according to epipolar constraint and determining a total number of the corresponding points, the corresponding points being selected from the second feature points; for each first feature point, when the total number of the corresponding points is greater than a preset value, calculating a color difference value between each first feature point and each of the corresponding points, and obtaining color difference values; and determining one of the corresponding points that is corresponding to the minimum color difference value in the color difference values as the target point;

determine a position difference value between each first feature point and a corresponding target point; and determine whether the corresponding target point is a matching point of each first feature point according to the position difference value between each first feature point and the corresponding target point;

wherein the at least one processor is further caused to:

determine a first object edge of the first image by using an edge detection algorithm, and mark the first object edge; determine a second object edge of the second image by using the edge detection algorithm, and mark the second object edge;

wherein the at least one processor determines the position difference value between each first feature point and the corresponding target point by: calculating a first distance parameter between the first object edge and each first feature point; calculating a second distance parameter between the target point of each first feature point and the second object edge; and calculating the position difference value according to the first distance parameter and the second distance parameter;

wherein each of the first distance parameter and the second distance parameter comprises a distance value in each of a preset number of directions;

wherein the at least one processor calculates the position difference value according to the first distance parameter and the second distance parameter by: calculating an initial position difference corresponding to each direction according to the first distance parameter and the second distance parameter; obtaining the position difference value by performing a weighted calculation to the initial position difference corresponding to each of the preset number of directions according to a preset weight.

5. The computer device according to claim 4, wherein the at least one processor is further caused to:

extract the first feature points from an area within the first object edge, and extract the second feature points from an area within the second object edge.

6. The computer device according to claim 4, wherein the at least one processor determines whether the corresponding target point is the matching point of each first feature point according to the position difference value between each first feature point and the corresponding target point by:

determining whether the position difference value between each first feature point and the corresponding target point is within a preset threshold range;

for any one of the first feature points, determining the corresponding target point as the matching point of the any one of first feature points when the position difference value between the any one of first feature points and the corresponding target point is within the preset threshold range; or determining the corresponding target point is not the matching point of the any one of first feature points when the position difference value between the any one of first feature points and the corresponding target point is not within the preset threshold range.

7. A non-transitory storage medium having stored thereon at least one computer-readable instruction, which when executed by a processor of a computer device, causes the processor to:

acquiring a first image and a second image by capturing a same object from two different viewing angles using at least one camera connected to the computer device;

extracting first feature points of the first image, and extracting second feature points of the second image;

matching the first feature points and the second feature points by determining a target point for each of the first feature points from the second feature points, the target point being one of the second feature points that is corresponding to a minimum color difference value, and comprising: setting the first image as a reference image, and determining corresponding points for each first feature point from the second feature points according to epipolar constraint and determining a total number of the corresponding points, the corresponding points being selected from the second feature points; for each first feature point, when the total number of the corresponding points is greater than a preset value, calculating a color difference value between each first feature point and each of the corresponding points, and obtaining color difference values; and determining one of the corresponding points that is corresponding to the minimum color difference value in the color difference values as the target point;

determining a position difference value between each first feature point and a corresponding target point; and determining whether the corresponding target point is a matching point of each first feature point according to the position difference value between the each first feature point and the corresponding target point;

wherein the method further comprises:

determining a first object edge of the first image by using an edge detection algorithm, and marking the first object edge; determining a second object edge of the second image by using the edge detection algorithm, and marking the second object edge:

wherein determining the position difference value between each first feature point and the corresponding target point comprises: calculating a first distance parameter between the first object edge and each first feature point; calculating a second distance parameter between the target point of each first feature point and the second object edge; and calculating the position difference value according to the first distance parameter and the second distance parameter;

wherein each of the first distance parameter and the second distance parameter comprises a distance value in each of a preset number of directions;

wherein calculating the position difference value according to the first distance parameter and the second distance parameter comprises: calculating an initial position difference corresponding to each direction according to the first distance parameter and the second distance parameter; obtaining the position difference value by performing a weighted calculation to the initial position difference corresponding to each of the preset number of directions according to a preset weight.

* * * * *